UNITED STATES PATENT OFFICE.

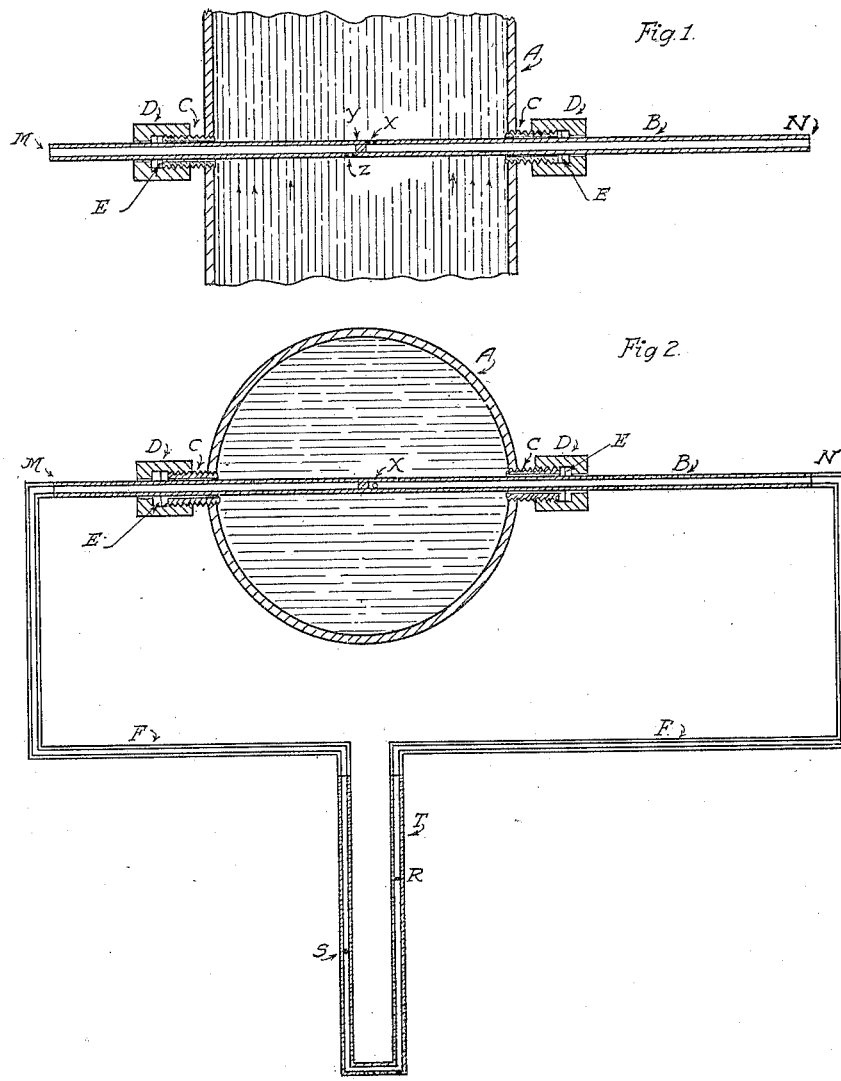

ARTHUR L. COLLINS, OF SANTA CRUZ, CALIFORNIA.

FLOW-INDICATING DEVICE.

1,374,359.   Specification of Letters Patent.   Patented Apr. 12, 1921.

Application filed August 22, 1919. Serial No. 319,081.

*To all whom it may concern:*

Be it known that I, ARTHUR L. COLLINS, a citizen of the United States, residing at Santa Cruz, in the county of Santa Cruz and State of California, have invented a new and useful Flow-Indicating Device.

My invention relates to improvements in Pitot tubes in connection with a differential pressure indicator. The object of my improvement is to provide a simple means of measuring the flow of a liquid or gas in a pipe by intercepting the flow with a tube of small diameter, which tube is provided with impact and vacuum openings, the tube entering the pipe through two stuffing boxes. The stuffing boxes diametrically opposed in the pipe provide a means for moving the tube across the pipe. The impact and suction openings in the tube can be withdrawn from the pipe and inspected without the necessity of removing any part of the apparatus.

The tube supported on each side of the pipe through the stuffing boxes offers a firm resistance against the pressure due to the flow of the liquid.

The readings of the instrument are easily checked by turning the tube 180 degrees.

The accompanying drawing illustrates the apparatus; Figure 1, is a horiontal section of the tube, stuffing boxes and pipe full of liquid or gas. Fig. 2, is a vertical section of the tube, stuffing boxes, pipe full of liquid or gas, a suitable type of differential pressure indicator and connections from tube to indicator.

A, is a pipe full of liquid or gas. B, is a tube of small diameter indicated by M—N with an opening at Z. Diametrically opposite but along the tube a distance is an opening at X. The tube is provided with a filler at Y, between Z and X so that the pressure at openings X and Z communicate outward. The opening at Z, for example, is placed in line of stream. The impact of stream on opening Z creates a pressure above that due to static pressure. The opening X on the down stream side creates a suction in opposition to the impact pressure. The pressure and suction action is communicated to the U tube differential indicator T, through connection F, where, for example, the surfaces of the mercury column are raised to R and S.

The calibration of the instrument can be made with the openings located at the center of the pipe or from readings taken transversely across the pipe. The elevation of mercury column or other suitable liquid column due to impact and suction action on openings in tube is a measure of the velocity of liquid or gas flowing in pipe.

C is a nipple or suitable fitting forming part of the stuffing box D, through which the tube is inserted. E is packing to prevent leakage around tube. The section at B of tube is of sufficient length to permit openings Z and X to be pushed toward M for inspection.

The tube can be turned 180 degrees so that check readings can be made upon mercury column reversed in legs of U tube. Suitable slip joints at M and N and connecting tubes F are provided at ends, Fig. 2, which permits the tube to rotate 180° without disconnecting the differential gage and connections F.

I claim as my invention,

1. A tube of uniform diameter and having intermediate its ends a closure plug, there being two openings in the walls of the tube adjacent to and separated by the plug, the two openings being diametrically placed in the walls of said tube, a pipe having diametrically placed perforations provided with stuffing boxes, the tube being inserted through said stuffing boxes.

2. A tube of uniform diameter and having intermediate its ends a closure plug, there being two openings in the walls of the tube adjacent to and separated by the plug, the two openings being diametrically placed in the walls of said tube, a pipe having diametrically placed perforations provided with stuffing boxes, the tube being inserted through said stuffing boxes, the tube being of sufficient length to permit withdrawal sufficiently to either side to expose the respective intermediate openings of the tube outside the stuffing box while the tube remains intact in stuffing boxes.

3. A tube of uniform diameter and having intermediate its ends a closure plug, there being two openings in the walls of the tube adjacent to and separated by the plug, the two openings being diametrically placed in the walls of said tube, a pipe having diametrically placed perforations provided with stuffing boxes, the tube being inserted through said stuffing boxes, and being free to rotate within the stuffing boxes.

ARTHUR L. COLLINS.

Witnesses:
R. J. CHAPMAN,
J. H. McDOUGAL.